United States Patent
Lakshmanan et al.

(10) Patent No.: US 10,164,911 B2
(45) Date of Patent: Dec. 25, 2018

(54) SHIM LAYER USED WITH A VIRTUAL MACHINE VIRTUAL NIC AND A HARDWARE PLATFORM PHYSICAL NIC

(71) Applicant: Cisco Technology, Inc., San Jose, CA (US)

(72) Inventors: Yegappan Lakshmanan, Fremont, CA (US); Atulya Chandra, Sunnyvale, CA (US); Nagaraj Arunkumar, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 169 days.

(21) Appl. No.: 14/946,907

(22) Filed: Nov. 20, 2015

(65) Prior Publication Data

US 2017/0149694 A1    May 25, 2017

(51) Int. Cl.
*H04Q 11/04*    (2006.01)
*G06F 13/24*    (2006.01)
*H04L 12/935*   (2013.01)

(52) U.S. Cl.
CPC ................... *H04L 49/3045* (2013.01)

(58) Field of Classification Search
CPC . H04L 49/3045; G06F 9/45558; G06F 9/455; G06F 9/545
USPC ............................................. 718/1; 710/260
See application file for complete search history.

(56) References Cited

U.S. PATENT DOCUMENTS

| | | | |
|---|---|---|---|
| 8,832,688 B2 | 9/2014 | Tang et al. | |
| 8,904,113 B2 | 12/2014 | Chen et al. | |
| 2002/0013821 A1* | 1/2002 | Kasper | G06F 5/065 709/213 |
| 2006/0173970 A1* | 8/2006 | Pope | G06F 9/4812 709/216 |
| 2011/0296411 A1* | 12/2011 | Tang | G06F 9/45545 718/1 |
| 2013/0326505 A1 | 12/2013 | Shah | |
| 2014/0233568 A1 | 8/2014 | Dong | |

(Continued)

OTHER PUBLICATIONS

"Virtual I/O Device (VIRTIO) Version 1.0", OASIS, Committee Specification Draft 01 / Public Review Draft 01, Dec. 3, 2013, http://docs.oasis-open.org/virtio/v1.0/csprd01/virtio-v1.0-csped01 . . . , 59 pages.

*Primary Examiner* — Asad M Nawaz
*Assistant Examiner* — Jason A Harley
(74) *Attorney, Agent, or Firm* — Edell, Shapiro & Finnan, LLC

(57) ABSTRACT

An emulator module integrated with a hypervisor executes on a host computer having a physical network interface card (pNIC). The hypervisor hosts a virtual machine having a virtual NIC (vNIC). The pNIC has pNIC receive pointers to point to receive packets loaded into a receive buffer by the pNIC. The vNIC has vNIC receive pointers for retrieval of the receive packets from the receive buffer. The emulator module accesses a pNIC receive pointer in the pNIC that points to the receive packet loaded into the receive buffer by the pNIC, and maps a vNIC receive pointer to the pNIC receive pointer accessed by the emulator module, to enable the vNIC to retrieve the receive packet from the receive buffer using the vNIC receive pointer. The emulator module notifies the vNIC to retrieve the receive packet from the receive buffer.

20 Claims, 7 Drawing Sheets

(56) References Cited

U.S. PATENT DOCUMENTS

2014/0281055 A1* 9/2014 Davda ................. G06F 12/1081
710/26
2015/0055468 A1* 2/2015 Agarwal ............. H04L 49/9047
370/232
2015/0365357 A1* 12/2015 Sreeramoju ............. H04L 49/70
370/218

* cited by examiner

SHIM LAYER USED WITH A VIRTUAL MACHINE VIRTUAL NIC AND A HARDWARE PLATFORM PHYSICAL NIC

TECHNICAL FIELD

Virtual and physical network interface cards (NICs) used in a virtualized system.

BACKGROUND

In a conventional virtualized environment using a Linux/Kernel-based Virtual Machine (KVM) hypervisor, virtual network interface cards (vNICs) of a virtual machine (VM) may be connected to a software switch including physical network interface cards (pNICs). Data traffic from the pNICs passes through the software switch to the vNICs of the virtual machine. A downside is the latency involved in sending and receiving packets to and from the VMs through the software switch. Another conventional virtualized environment uses Peripheral Component Interconnect (PCI) Single Root Input/Output Virtualization (SR-IOV), in which a pNIC is logically divided into multiple virtual functions (VFs), each assigned to communicate with a corresponding vNIC in a VM over a corresponding virtual interface. To use SR-IOV, a VM needs to support/provide an appropriate virtual device driver for the vNIC that interfaces with the particular VF of the pNIC. Often, the VM does not support the appropriate driver and thus the VF is unable to directly access the vNIC.

DESCRIPTION OF EXAMPLE EMBODIMENTS

Overview

An emulator module integrated with a hypervisor is configured to execute on a host computer having a physical network interface card (NIC). The hypervisor is configured to host a virtual machine having a virtual NIC (NIC). For receive packet processing, the host computer has a receive buffer for transfer of receive packets from the physical NIC to the virtual NIC. The physical NIC has physical NIC receive pointers updated by the physical NIC to point to receive packets loaded into the receive buffer by the physical NIC. The virtual NIC has virtual NIC receive pointers for retrieval of the receive packets from the receive buffer. For each receive packet loaded into the receive buffer by the physical NIC, the emulator module accesses a physical NIC receive pointer among the physical NIC receive pointers in the physical NIC that points to the receive packet loaded into the receive buffer by the physical NIC. The emulator module maps a virtual NIC receive pointer among the virtual NIC receive pointers to the physical NIC receive pointer accessed by the emulator module to enable the virtual NIC to retrieve the receive packet from the receive buffer using the virtual NIC receive pointer. The emulator module notifies the virtual NIC to retrieve the receive packet from the receive buffer.

For transmit packet processing, the host computer has a transmit buffer for transfer of transmit packets from the virtual NIC to the physical NIC. The virtual NIC has virtual NIC transmit pointers updated by the virtual NIC to point to transmit packets loaded into the transmit buffer by the virtual NIC. The physical NIC has physical NIC transmit pointers for retrieval of the transmit packets from the transmit buffer. For each transmit packet loaded into the transmit buffer by the virtual NIC, the emulator module accesses a virtual NIC transmit pointer among the virtual NIC transmit pointers that points to the transmit packet loaded into the transmit buffer by the virtual NIC. The emulator module maps a physical NIC transmit pointer among the physical NIC transmit pointers in the physical NIC to the virtual NIC transmit pointer accessed by the emulator module to enable the physical NIC to retrieve the transmit packet from the transmit buffer using the physical NIC transmit pointer. The emulator module notifies the physical NIC that the transmit packet is available for retrieval from the transmit buffer.

Example Embodiments

Figure 1:
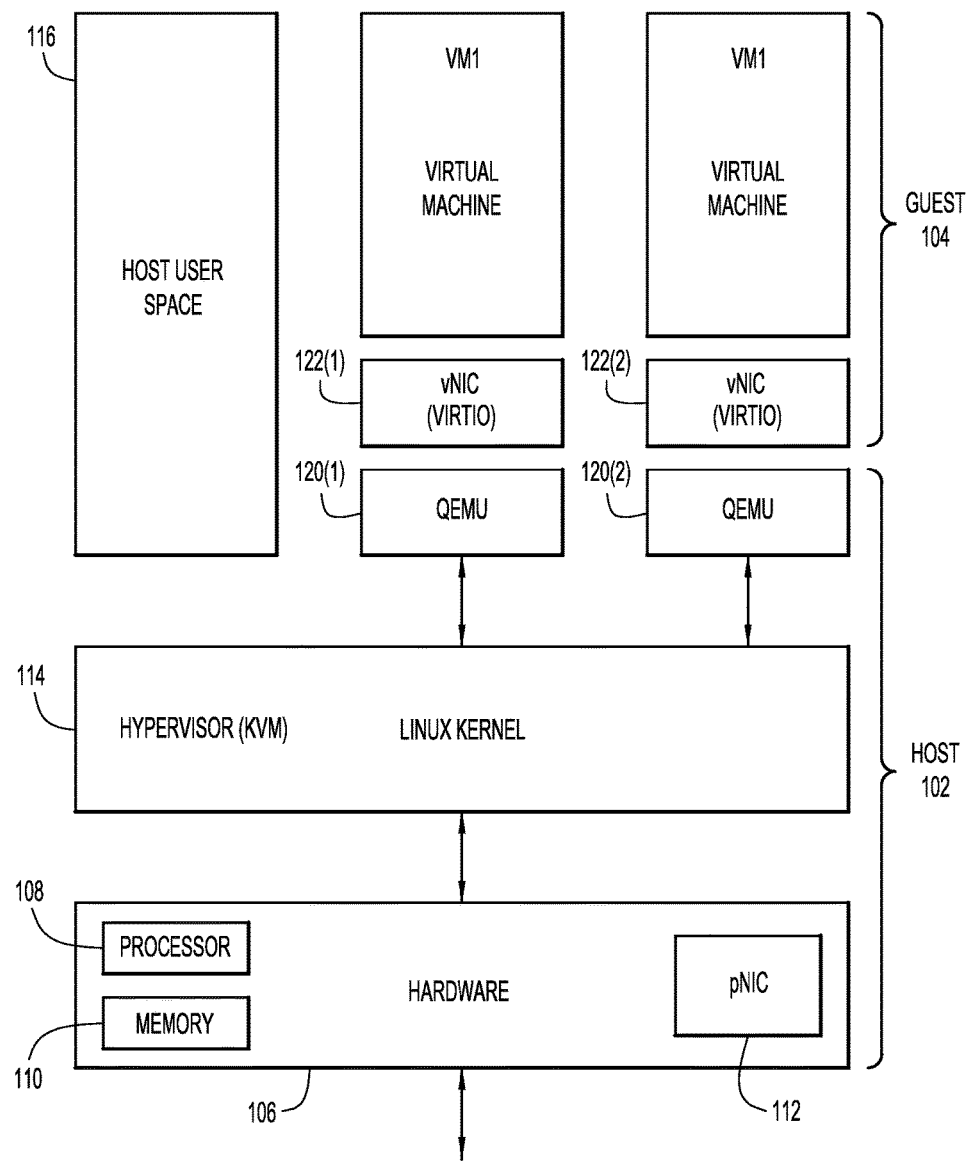
FIG. 1 is a block diagram of a computer virtualization system in which embodiments described herein may be implemented, according to an embodiment.

Reference is first made to FIG. 1 that shows a block diagram of a computer virtualization system 100 in which embodiments described herein may be implemented. Computer virtualization system 100 includes a host computer system 102 to host virtualized guest components 104. Host computer system 102 includes a hardware platform 106 including a processor 108, memory 110, and a physical network interface card physical network interface card (physical NIC or pNIC) 112 as an example of one or more input/output (I/O) devices to perform data I/O operations.

Host computer system 102 includes a hypervisor 114 that executes on hardware platform 106 to host virtualized guest components 104, including virtual machines VM1 and VM2, and user space computer programs/applications 116. In an embodiment, hypervisor 114 includes a Linux Kernel integrated with Kernel-based Virtual Machine (KVM). In an example in which processor 108 includes an x86 processor, KVM permits guest components 104 to use the hardware virtualization features of the x86 processor.

Host computer system 100 also includes Quick Emulator (QEMU) integrated with KVM (in hypervisor 114). QEMU includes computer programs that implement a machine emulator (i.e., a device emulator) and virtualizer. QEMU supports virtualization when executing with KVM. For example, QEMU instances 120(1) and 120(2) may emulate or assist KVM in virtualizing respective computer I/O devices in virtual machines VM1 and VM2, such as virtualized hard disks, compact disk drives, and NICs.

In guest components 104, virtual machine VM1 includes a virtualized (i.e., virtual) NIC (virtual NIC or vNIC) 122(1) (labeled as "Virtio" in FIG. 1) and virtual machine VM2 includes a vNIC 122(2). Virtual machines VM1 and VM2 exchange data packets ("packets") with pNIC 112 in host 102 via vNICs 122(1) and 122(2) under control of QEMU instances 120(1) and 120(2), respectively, as will be described below. VNIC 122(1) and vNIC 122(2) may each be implemented or created in accordance with Virtio, in which case the vNICs are referred to as "Virtio devices" or "Virtio NICs." Virtio is a virtualization standard for implementing virtual Input/Output (I/O) devices (such as NICs, disk drives, and the like) in a virtual machine, and may be considered as an abstraction for a set of common emulated devices in a hypervisor.

Figure 2:
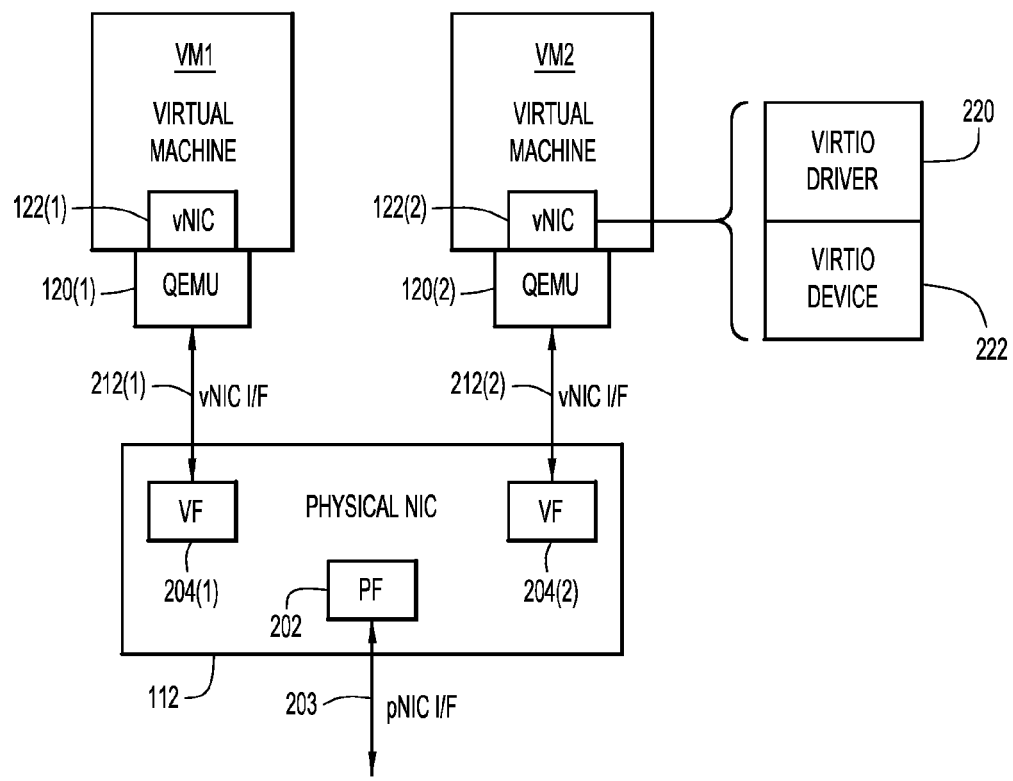
FIG. 2 is a block diagram of a physical network interface card (pNIC) interconnected with virtual machine virtual network interface cards (vNICs) over virtual interfaces, according to an embodiment.

With reference to FIG. 2, there is a block diagram of pNIC 112 interconnected with virtual machines VM1 and VM2 over virtual interfaces. In the example of FIG. 2, pNIC 112 is implemented in accordance with a peripheral component interconnect (PCI) standard extended to support single root I/O virtualization (SR-IOV) interfaces, for example. SR-IOV permits pNIC 112 to separate access to its resources among a physical function (PF) and multiple virtual functions (VFs). Thus, pNIC 112 includes a physical function (PF) 202 that configures pNIC 112 and supports I/O operations over a pNIC interface (I/F) 203. PNIC 112 also includes a virtual function (VF) 204(1) and a VF 204(2). VF 204(1) implements a vNIC interface 212(1) with vNIC 122(1) over which VM1 and pNIC 112 exchange packets. Similarly, VF 204(2) implements a vNIC interface 212(2) with vNIC 122(2) over which VM2 and pNIC 112 exchange packets under control of QEMU 120(2).

VNICs 122 each include a respective Virtio driver 220 and a respective Virtio device 222 controlled by the Virtio driver. Together, Virtio driver 220 and Virtio device 222 instantiate a complete vNIC. QEMU instance 120(1) interacts/communicates with (i) respective Virtio driver 220 and respective Virtio device 222 of vNIC 122(1), and (ii) VF 204(1) of pNIC 112, to control packet transfers directly between the vNIC and the pNIC over vNIC I/F 212(1), without invoking any other hypervisor functions. Similarly, QEMU instance 120(2) interacts/communicates with (i) respective Virtio driver 220 and respective Virtio device 222 of vNIC 122(2), and (ii) VF 204(2) of pNIC 112, to enable packet transfers directly between the vNIC and the pNIC over vNIC I/F 212(2), without invoking any other hypervisor functions.

Figure 3:
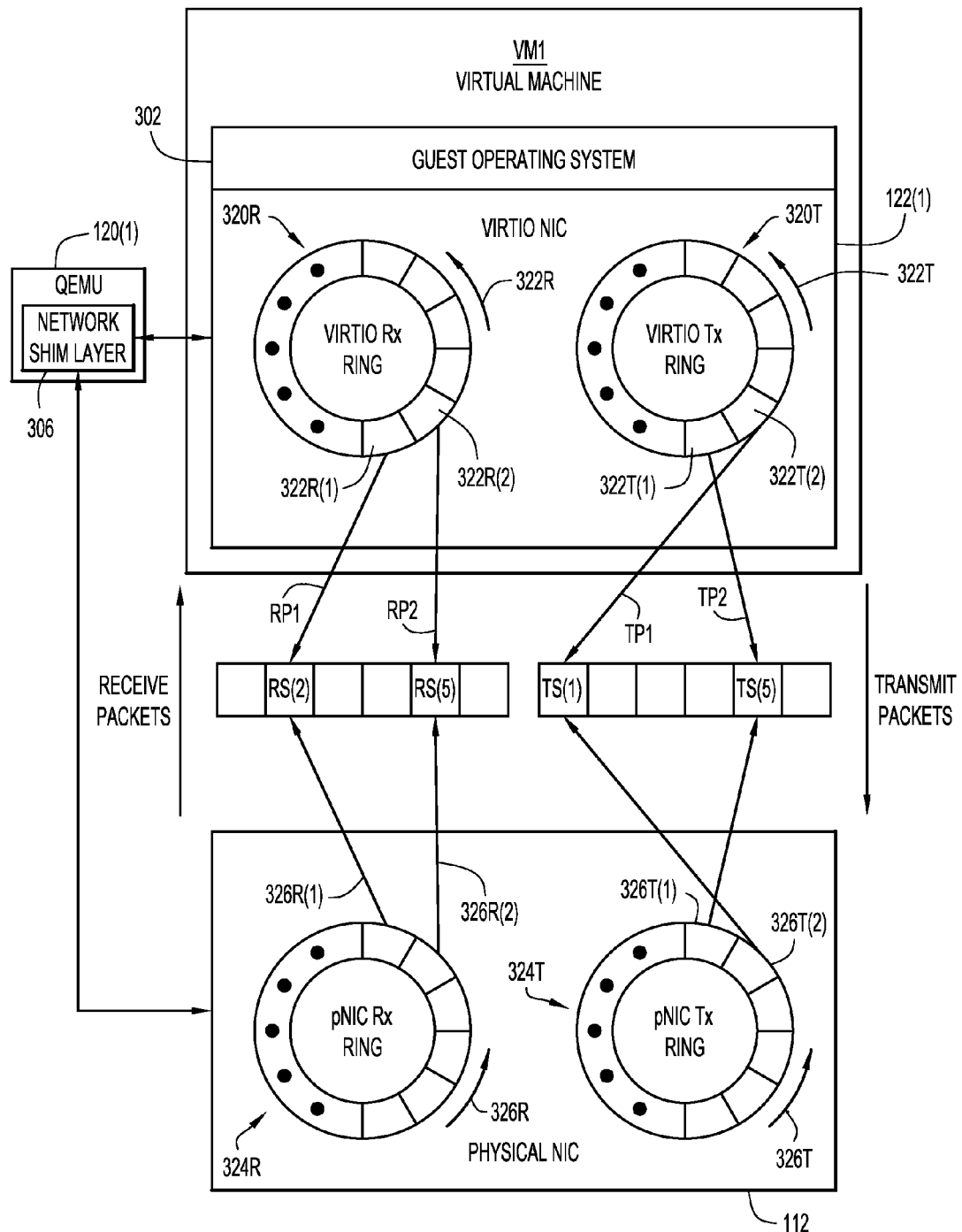
FIG. 3 is a detailed block diagram of a vNIC and a pNIC from FIG. 2 that shows data structures used to transfer transmit and receive packets between the vNIC and the pNIC, according to an embodiment.

With reference to FIG. 3, there is a detailed block diagram of vNIC 122(1) (labeled as "Virtio NIC" in FIG. 3) and pNIC 112 to show modules/structures therein used to transfer transmit packets from the vNIC to the pNIC and to transfer receive packets from the pNIC to the vNIC. In FIG. 3, virtual machine VM1 executes a guest operating system 302, which may communicate with vNIC 122(1).

In a transmit direction, virtual machine VM1 transfers packets to pNIC 112 using vNIC 122(1). To this end, vNIC 122(1) transfers transmit packets from the vNIC directly to pNIC 112 through a transmit packet buffer TB (referred to as simply a "transmit buffer") under control of a network shim layer or driver 306, such as an emulator module. In an embodiment, the emulator module 306 may be implemented and referred to as a QEMU module in QEMU instance 120(1). In computer technology, a "shim" generally refers to a small library that transparently intercepts operation calls and changes arguments passed therein, and handles the call operations, or redirects the operations elsewhere. Transmit buffer TB includes sequential transmit packet slots TS(1)-TS(a) to store respective transmit packets loaded into the transmit packet slots by vNIC 122(1). A portion of memory 110 in virtualization environment 100 may be allocated to transmit buffer TB.

To support the transfer of transmit packets from vNIC 122(1) to pNIC 112 via transmit buffer TB, vNIC 221(1) includes a configurable transmit descriptor 320T (also referred to as a "Virtio transmit ring") having sequential descriptor entries 322T(1)-322T(b) (shown as sequential sectors on a perimeter of transmit descriptor 320T) for respective transmit pointers to corresponding transmit packets loaded into (i.e., stored to) transmit packet slots TS of transmit buffer TB by vNIC 122(1). That is, each transmit descriptor entry 322T(i) stores (i) a transmit pointer to (i.e., a memory address of) a corresponding transmit packet loaded into a corresponding one of packet slots TS in transmit buffer TB, and (ii) an associated/corresponding activity indicator that is set to indicate that the transmit packet has been loaded into the corresponding packet slot. Transmit descriptor 320T may be implemented as a Virtio virtual queue.

Similarly, pNIC 112(1) includes a configurable transmit descriptor 324T (referred to as a "pNIC transmit ring") having sequential descriptor entries 326T(1)-326T(c) for respective transmit pointers to the transmit packets loaded into transmit buffer 306 by vNIC 122(1). PNIC 112(1) uses the transmit pointers in descriptor entries 326T to retrieve from transmit buffer TB the transmit packets to which the corresponding transmit pointers point.

As will be described below, QEMU module 306 accesses vNIC transmit descriptor 320T and pNIC transmit descriptor 324T to map pNIC transmit pointers in pNIC transmit descriptor entries 326T to corresponding ones of vNIC transmit pointers in vNIC transmit descriptor entries 322T, i.e., the QEMU module configures the pNIC transmit pointers to match corresponding ones of the vNIC transmit pointers. This transmit pointer mapping between vNIC 122(1) and pNIC 112 by QEMU module 306 enables the pNIC to retrieve the transmit packets loaded into transmit buffer TB by vNIC 122(1). In the example, of FIG. 3, vNIC 122(1) has loaded (i) a first transmit packet into packet slot TS(1) and a corresponding transmit pointer TP1 to that transmit packet into vNIC transmit descriptor entry 322T(2), and (ii) a second transmit packet into packet slot TS(5) and a corresponding transmit pointer TP2 to that transmit packet into vNIC transmit descriptor entry 322T(1). In response, QEMU module 306 has mapped, e.g., copied, (i) transmit pointer TP1 into pNIC transmit descriptor entry 326T(2), and (ii) transmit pointer TP2 into pNIC transmit descriptor entry 326T(1) to enable pNIC 112 to retrieve the first and second transmit packets from transmit buffer TB.

In a receive direction, pNIC 112 (e.g., VF 204(1)) transfers receive packets (i.e., packets received at the pNIC form some external device) to virtual machine VM1 through vNIC 122(1). To this end, pNIC 112 transfers the receive packets from the pNIC directly to vNIC 122(1) through a receive packet buffer RB (referred to as simply a "receive buffer") under control of QEMU module 306. Receive buffer RB includes sequential receive packet slots RS(1)-RS(d) to store respective receive packets loaded into the receive buffer by pNIC 112. Receive buffer RB is shared by pNIC 112 and vNIC 122(1) so that the pNIC and the vNIC are each able to access, e.g., read from and write to, the receive buffer. A portion of memory 110 may be allocated to receive buffer RB.

To support the transfer of receive packets in the receive direction from pNIC 112 to vNIC 122(1), the pNIC includes a configurable receive descriptor (also referred to as a "pNIC receive ring") 324R having sequential receive descriptor entries 326R(1)-326R(e) for respective receive pointers to corresponding receive packets loaded into (i.e., stored to) receive packet slots RS of receive buffer RB by pNIC 112. That is, each receive descriptor entry 326R(i) stores (i) a receive pointer to (e.g., memory address of) a corresponding receive packet loaded into a corresponding one of packet slots RS in receive buffer RB, and (ii) an associated activity indicator that is set to indicate that the receive packet has been loaded into the corresponding packet slot. Similarly, vNIC 122(1) includes a configurable receive descriptor 320R (referred to as a "Virtio receive ring") having sequential descriptor entries 322R(1)-322R(f) for respective receive pointers to the receive packets loaded into receive buffer RB by pNIC 112. VNIC 122(1) uses the receive pointers in descriptor entries 322R to retrieve from receive buffer RB the receive packets to which the corresponding receive pointers point.

As will be described below, QEMU module 306 access vNIC receive descriptor 320R and pNIC receive descriptor 324R to map vNIC receive pointers in vNIC receive descriptor entries 322R to corresponding ones of pNIC receiver pointers in pNIC receive descriptors 326R, i.e., the QEMU module configures the vNIC receive pointers to match corresponding ones of the pNIC receive pointers. This receive pointer mapping between pNIC 112 and vNIC 122(1) enables the vNIC to retrieve the receive packets loaded into receive buffer RB by pNIC 112. In the example, of FIG. 3, pNIC 112 has loaded (i) a first receive packet into packet slot RS(2) and a corresponding receive pointer RP1 to that receive packet into pNIC receive descriptor entry 326R(1), and (ii) a second receive packet into packet slot RS(5) and a corresponding receive pointer RP2 to that receive packet into pNIC receive descriptor entry 326R(2). In response, QEMU module 306 has mapped, e.g., copied, (i) receive pointer RP1 from pNIC receive descriptor entry 326(1) into vNIC receive descriptor entry 322R(1), and (ii) receive pointer RP2 from pNIC receive descriptor entry 326(2) into vNIC receive descriptor entry 322R(2) to enable vNIC 122(1) to retrieve the first and second receive packets from receive buffer RB.

Methods are now described with reference to FIGS. 4-6. The methods refer to vNIC 122(1) by way of example only, and apply equally to vNIC 122(2).

Figure 4:
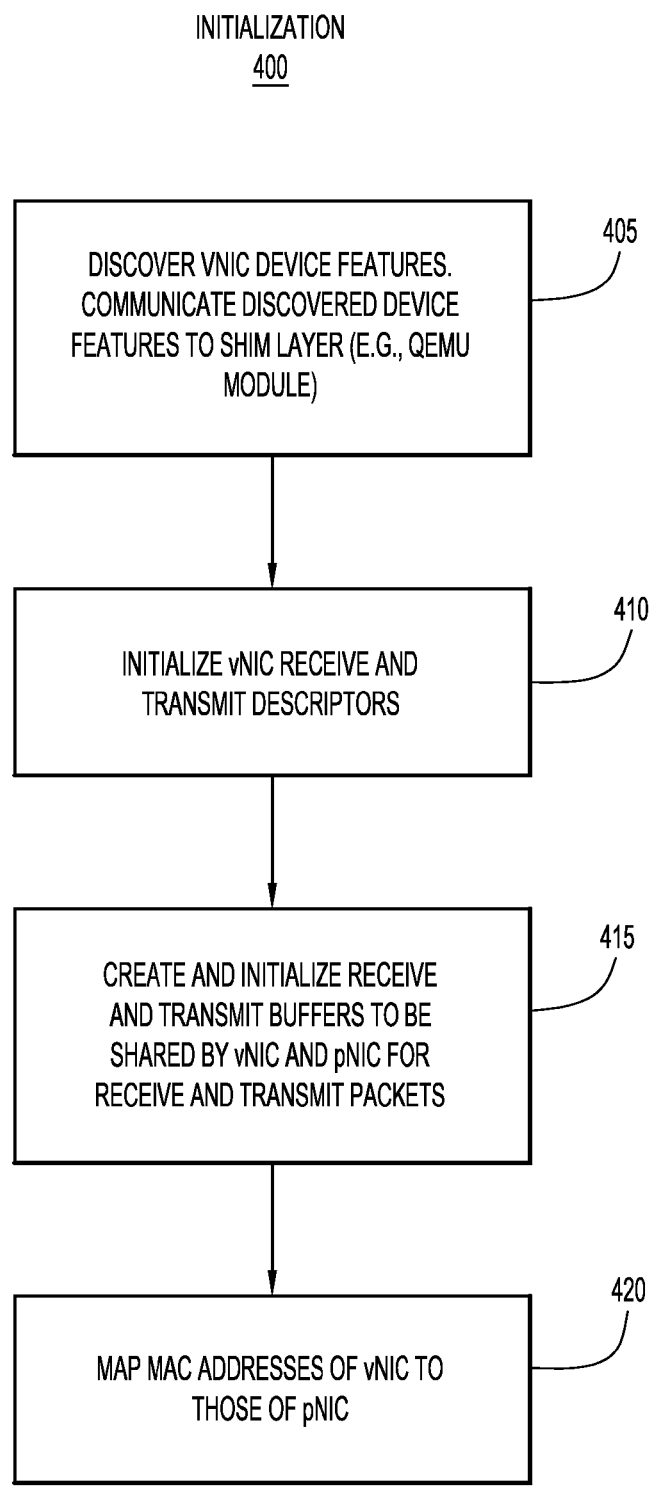
FIG. 4 is a flowchart of an example method of initializing data structures in connection with a shim layer (e.g., a Quick-Emulator (QEMU) module) of FIG. 3 in preparation for subsequent receive and transmit packet operations, according to an embodiment.

With reference to FIG. 4, there is a flowchart of an example method 400 of initializing data structures in the structures depicted in FIG. 3 with in preparation for subsequent receive and transmit packet operations. Method 400 may be invoked when guest operating system 302 starts or boots.

At 405, Virtio driver 220 of vNIC 122(1) communicates with, e.g., sends device probes to, Virtio device 222 of the vNIC to discover vNIC device features supported by the vNIC. VNIC device features may include, but are not limited to, checksum off-loading, "jumbo" packet implementation, and virtual local area network (VLAN) implementation. Then, Virtio driver 220 communicates with a device emulator module (e.g., QEMU module 306) to report the discovered device features to the QEMU module (which receives the report). In response, QEMU module 306 configures itself to support the discovered vNIC device features.

At 410, QEMU module 306 initializes vNIC receive and transmit descriptors 320T and 320R. For example, QEMU module 306 configures a memory size and location of each descriptor and also which descriptor entries are to point to which buffer slots TS and RS. QEMU module 306 stores the initialized descriptor information in memory accessible to the QEMU module and also reports the initialized descriptor information to Virtio driver 220 so that the Virtio driver is able to access/update descriptors 320T and 320R during transmit and receive operations.

At 415, Virtio driver 220 creates and initializes receive and transmit buffers RB and TB in memory 110, and communicates addresses for the receive buffer and the transmit buffer to QEMU module 306. In turn, QEMU module 306 sends the addresses of receive and transmit buffers RB and TB to pNIC 112 to enable the pNIC to access the buffers. As a result, both vNIC 122(1) and pNIC 112 are able to access/share receive and transmit buffers RB and TB. In another embodiment, only receiver buffer RB is created and initialized at 415 (e.g., at operating system boot-up), while transmit buffer TB is created and initialized later when a first packet is transmitted (as described below in connection with method 600 and FIG. 6).

At 420, QEMU module 306 may map receive and transmit media access control (MAC) addresses for vNIC 222(1) to transmit and receive MAC addresses for pNIC 112, and store the MAC address mappings in the QEMU module for access by both the vNIC and the pNIC.

Figure 5:
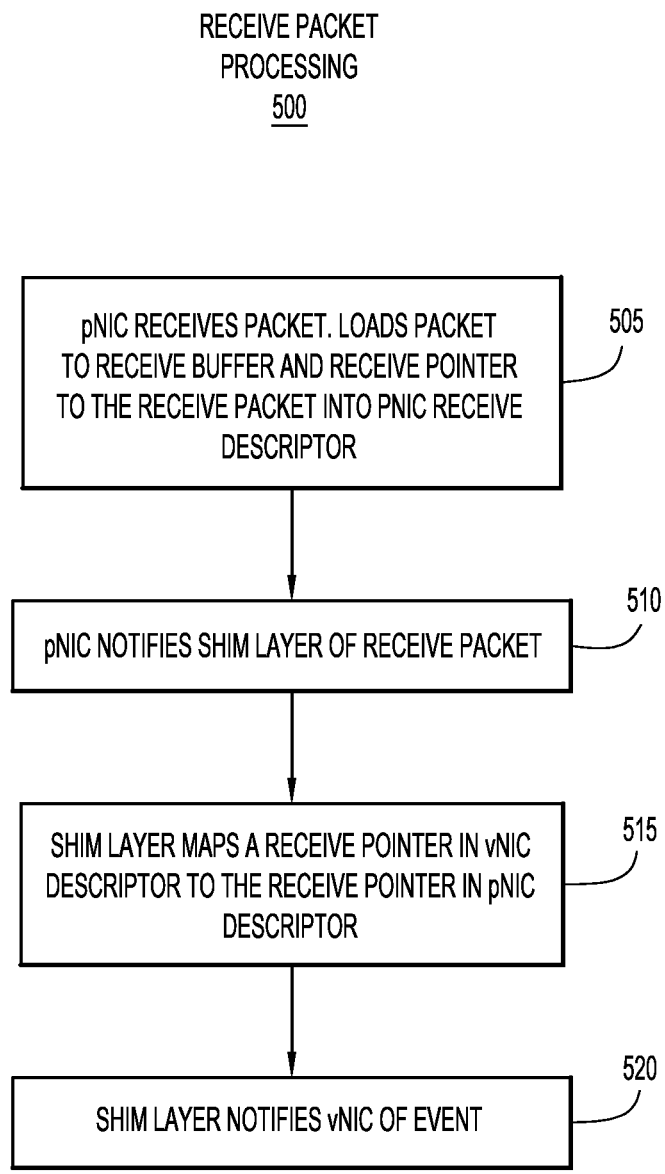
FIG. 5 is a flowchart of an example method of receive packet processing used to transfer a receive packet from the pNIC to the vNIC performed in connection with the shim layer, according to an embodiment.

With reference to FIG. 5, there is a flowchart of an example method 500 of receive packet processing (i.e., performing receive packet operations) used to transfer a receive packet from pNIC 112 to vNIC 122(1) performed in connection with a device emulator module (e.g., QEMU module 306).

At 505, pNIC 112 receives the packet (i.e., the receive packet) and loads the receive packet to a corresponding one of receive slots RS in receive buffer RB. PNIC 112 updates a receive pointer in a corresponding one of pNIC receive descriptor entries 326R of receive descriptor 324R to point to the corresponding receive slot, and also sets an activity flag in the descriptor entry to indicate the event (i.e., that the receive packet has been stored to the receive buffer). For example, pNIC 112 loads the receive packet into receive slot RS(2), and sets pointer RP1 in pNIC receive descriptor slot 326R(1) to point to that receive slot.

At 510, in response to loading the receive packet into receive buffer RB, pNIC 112 notifies QEMU module 306 of the event. In an example, pNIC 112 notifies QEMU module 306 of the event via an interrupt, such a KVM "irqfd" interrupt.

At 515, responsive to the notification, QEMU module 306 maps a receive pointer of vNIC 122(1) to the receive pointer in pNIC 112 so that the vNIC is able to retrieve the receive packet from receive buffer RB. For example, QEMU module 306 copies (i.e., reads and then writes) receive pointer RP1 from pNIC receive descriptor entry 326R(1) to vNIC receive descriptor entry 322R(1) of vNIC receive descriptor 320R so that the pNIC receive descriptor entry and the vNIC descriptor entry match, i.e., both point to the same receive slot (e.g., RS(1)). QEMU module 306 may also store the mapping between the pNIC and vNIC receive descriptor entry receive pointers in a QEMU mapping table having entries that map the pointers to each other.

At 520, responsive to performing the mapping at 515, QEMU module 306 notifies Virtio driver 220 of the event, i.e., that the receive packet is available in receive buffer RB. In an example, QEMU module 306 notifies Virtio driver 220 of the event via an interrupt, such a KVM "irqfd" interrupt. Responsive to the notification, Virtio driver 220 accesses receive pointer RP1 in vNIC receive descriptor entry 322R(1) of vNIC receive descriptor 320R and then retrieves the receive packet from receive slot RS(2) using the accessed receive pointer.

Figure 6:
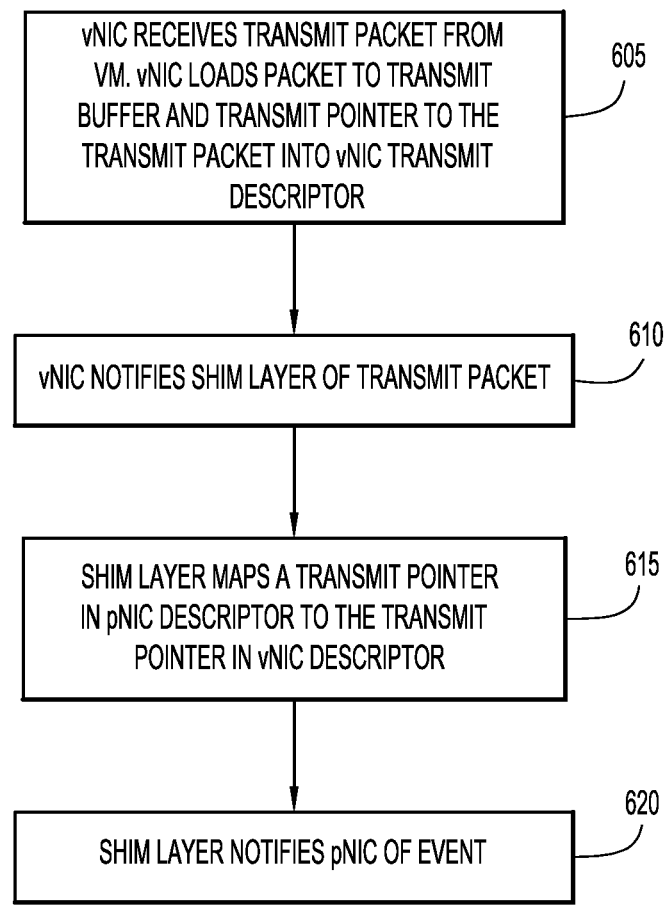
FIG. 6 is a flowchart of an example method of transmit packet processing used to transfer a transmit packet from the vNIC to the pNIC performed in connection with the shim layer, according to an embodiment.

With reference to FIG. 6, there is a flowchart of an example method 600 of transmit packet processing (i.e., performing transmit packet operations) used to transfer a transmit packet from vNIC 122(1) to pNIC 112 performed in connection with a device emulator module (e.g., QEMU module 306).

At 605, vNIC 122(1) (e.g., Virtio driver 220) receives a transmit packet destined for pNIC 112 from virtual machine VM1. VNIC 122(1) (e.g., Virtio driver 220) loads the transmit packet into packet slot TS(1) of transmit buffer TB, loads/stores transmit pointer TP1 pointing to that packet slot into vNIC transmit descriptor entry 322T(2) of transmit descriptor 320T, and sets an activity flag in that transmit descriptor entry to indicate the event (i.e., that the transmit packet has been stored to the transmit buffer). In the embodiment in which transmit buffer TB was not created and initialized at boot-up (as mentioned in connection with operation 415 above), the transmit buffer is created and initialized at 605 before the transmit packet is loaded into the transmit buffer.

At 610, after loading the transmit packet into transmit buffer TB, vNIC 122(1) (e.g., Virtio driver 220) notifies QEMU module 306 of that event. In an example, vNIC 122(1) notifies QEMU module 306 of the event via a Virtio "kick" event.

At 615, responsive to the notification, QEMU module 306 maps a transmit pointer in pNIC transmit descriptor entry 326T(2) of pNIC transmit descriptor 324T to transmit pointer TP1 in vNIC transmit descriptor entry 322T(2) of vNIC transmit descriptor 320T (e.g., the QEMU module copies transmit pointer TP1 from vNIC transmit descriptor entry 322T(2) to pNIC transmit descriptor entry 326T(2)) so that the pNIC is able to retrieve the transmit packet from transmit buffer TB. QEMU module 306 may also store the mapping between the vNIC and pNIC transmit descriptor entry transmit pointers in the QEMU mapping table.

At 620, after performing the mapping at 615, QEMU module 306 notifies pNIC 112 of the event, i.e., that the transmit packet is available in transmit buffer RB. In an example, QEMU module 306 notifies pNIC 112 of the event via an interrupt, such a KVM "eventfd" interrupt. Responsive to the notification, pNIC 112 accesses transmit pointer TP1 in pNIC transmit descriptor entry 326T(2) of pNIC transmit descriptor 324T and then retrieves the transmit packet from transmit slot TS(1) using the accessed transmit pointer.

Figure 7:
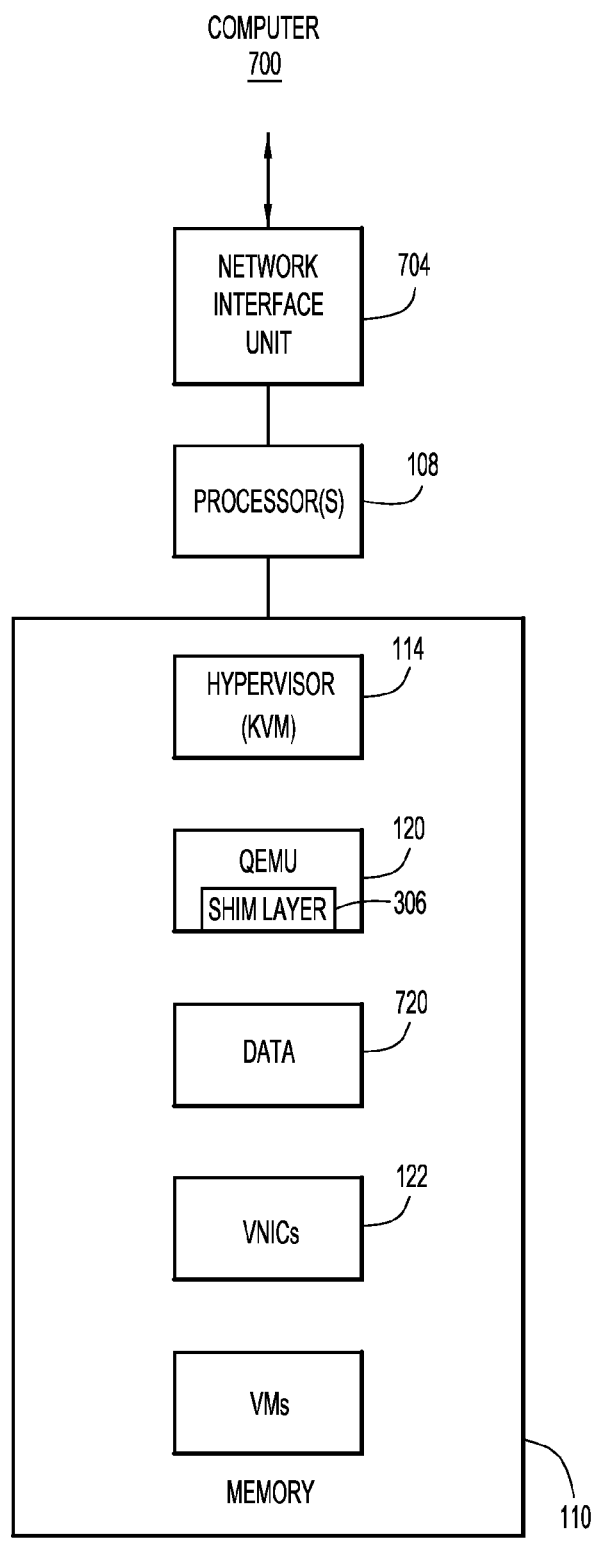
FIG. 7 is a block diagram of a computer configured to implement the virtualization system of FIG. 1, and to perform the transmit packet processing method and the receive packet processing method described herein, according to an embodiment.

Referring now to FIG. 7, there is shown an example block diagram of computer 700 configured to implement virtualization system 100 and perform the methods described herein. Computer 700 includes processor 108, a network interface unit 704, and memory 110. The processor 108 is for example, a microprocessor or a microcontroller. The network interface unit 704 is a device that is configured to enable communications over a communication network, and may include pNIC 112.

The memory 110 is a tangible processor readable or computer readable memory that stores or is encoded with instructions that, when executed by the processor 108, cause the processor 108 to perform functions described herein. Memory 110 may comprise read only memory (ROM), random access memory (RAM), magnetic disk storage media devices, optical storage media devices, flash memory devices, electrical, optical, or other physical/tangible memory storage devices. Thus, in general, the memory 110 may comprise one or more tangible (non-transitory) computer readable storage media (e.g., a memory device) encoded with software comprising computer executable instructions and when the software is executed (by the processor 108) it is operable to perform the operations described herein, including operations to create virtualization environment 100 and perform the methods described herein, including methods 400-600. For example, the memory 110 is encoded with instructions for hypervisor 114 (e.g., KVM), QEMU instances 120 including shim layer 306 (e.g., QEMU module 306), VMs VM1 and VM2, and virtual drivers and virtual devices for vNICs 122.

The memory 110 also stores data 720 accessed and/or generated by the above-mentioned instructions.

In summary, the use of SR-IOV devices with VMs that do not need specific pNIC VF device drivers is presented. Instead of directly exposing the pNIC VF to the VM, a Virtio NIC can be exposed to the VM. Thus, the VM does not need a physical device (i.e., pNIC) specific driver. In the host system, a custom Linux Kernel driver module (e.g., a shim layer) is used to hide the pNIC details and expose a standard Virtio NIC to the VM. This shim layer may be implemented in a QEMU emulation layer using a Virtio interface. The Virtio transmit and receive descriptors are mapped to the VF transmit and receive descriptors in the pNIC. Using this approach, the advantages of SR-IOV can be retained while at the same time the VM does not need to support a specific SR-IOV driver for the pNIC. Transmit and receive packets are transferred between the pNIC VF and the VM Virtio NIC without additional packet copies using shared receive and transmit buffers.

In summary, in one form, a method is provided comprising: at an emulator module integrated with a hypervisor configured to execute on a host computer having a physical network interface card (NIC), the hypervisor configured to host a virtual machine having a virtual NIC, the host computer having a receive buffer for transfer of receive packets from the physical NIC to the virtual NIC, the physical NIC having physical NIC receive pointers updated by the physical NIC to point to receive packets loaded into the receive buffer by the physical NIC, the virtual NIC having virtual NIC receive pointers for retrieval of the receive packets from the receive buffer, for each receive packet loaded into the receive buffer by the physical NIC: accessing a physical NIC receive pointer among the physical NIC receive pointers in the physical NIC that points to the receive packet loaded into the receive buffer by the physical NIC; mapping a virtual NIC receive pointer among the virtual NIC receive pointers to the physical NIC receive pointer accessed by the emulator module to enable the virtual NIC to retrieve the receive packet from the receive buffer using the virtual NIC receive pointer; and notifying the virtual NIC to retrieve the receive packet from the receive buffer.

In still another form, a method is provided comprising: at an emulator module integrated with a hypervisor configured to execute on a host computer having a physical network interface card (NIC), the hypervisor configured to host a virtual machine having a virtual NIC, the host computer having a transmit buffer for transfer of transmit packets from the virtual NIC to the physical NIC, the virtual NIC having virtual NIC transmit pointers updated by the virtual NIC to point to transmit packets loaded into the transmit buffer by the virtual NIC, the physical NIC having physical NIC transmit pointers for retrieval of the transmit packets from the transmit buffer, for each transmit packet loaded into the transmit buffer by the virtual NIC: accessing a virtual NIC transmit pointer among the virtual NIC transmit pointers that points to the transmit packet loaded into the transmit buffer by the virtual NIC; mapping a physical NIC transmit pointer among the physical NIC transmit pointers in the physical NIC to the virtual NIC transmit pointer accessed by the emulator module to enable the physical NIC to retrieve the transmit packet from the transmit buffer using the physical NIC transmit pointer; and notifying the physical NIC that the transmit packet is available for retrieval from the transmit buffer.

In another form, an apparatus is provided comprising: a physical network interface card (NIC); a receive buffer coupled to the physical NIC; and a processor coupled with the physical NIC and the receive buffer, and configured to execute an emulator module integrated with a hypervisor, the hypervisor configured to host a virtual machine having a virtual NIC, the receive buffer for transfer of receive packets from the physical NIC to the virtual NIC, the physical NIC having physical NIC receive pointers updated by the physical NIC to point to receive packets loaded into the receive buffer by the physical NIC, the virtual NIC having virtual NIC receive pointers for retrieval of the receive packets from the receive buffer, wherein the emulator module is configured to, for each receive packet loaded into the receive buffer by the physical NIC: access a physical NIC receive pointer among the physical NIC receive pointers in the physical NIC that points to the receive packet loaded into the receive buffer by the physical NIC; map a virtual NIC receive pointer among the virtual NIC receive pointers to the physical NIC receive pointer accessed by the emulator module to enable the virtual NIC to retrieve the receive packet from the receive buffer using the virtual NIC receive pointer; and notify the virtual NIC to retrieve the receive packet from the receive buffer.

In still another form, a tangible processor readable medium is provided for storing instructions that, when executed by a processor, cause the processor to execute an emulator module integrated with a hypervisor hosted on a computer and that supports a virtual machine, wherein the emulator module includes instructions to cause the processor to perform each of the methods described above, including the receive and transmit packet methods.

Although the apparatus, system, method, and computer program product are illustrated and described herein as embodied in one or more specific examples, it is nevertheless not intended to be limited to the details shown, since various modifications and structural changes may be made therein without departing from the scope of the apparatus, system, method, and computer program product and within the scope and range of equivalents of the claims. Accordingly, it is appropriate that the appended claims be construed broadly and in a manner consistent with the scope of the apparatus, system, method, and computer program product, as set forth in the following claims.

What is claimed is:

1. A method comprising:
    at an emulator module integrated with a hypervisor configured to execute on a host computer having a physical network interface card (NIC), the hypervisor configured to host a virtual machine having a virtual NIC, the host computer having a receive buffer for transfer of receive packets from the physical NIC to the virtual NIC, the physical NIC including a physical NIC receive descriptor ring of receive pointers updated by the physical NIC to point to respective receive packets loaded into respective slots of the receive buffer by the physical NIC, the virtual NIC including a virtual NIC receive descriptor ring of virtual NIC receive pointers for retrieval of the receive packets from the receive buffer, for each receive packet loaded into the receive buffer by the physical NIC:
        accessing a physical NIC receive pointer among the physical NIC receive pointers in the physical NIC receive descriptor ring that points to the receive packet loaded into the respective slot of the receive buffer by the physical NIC;
        copying the physical NIC receive pointer accessed by the emulator module from the physical NIC receive descriptor ring to a virtual NIC receive pointer in the virtual NIC receive descriptor ring so that the virtual NIC receive pointer points to the receive packet in the receive buffer to enable the virtual NIC to retrieve the receive packet from the respective slot of the receive buffer using the virtual NIC receive pointer; and
        notifying the virtual NIC to retrieve the receive packet from the receive buffer.

2. The method of claim 1, further comprising:
    prior to the accessing, receiving from the physical NIC a receive notification that the receive packet has been loaded; and
    responsive to the receive notification, performing the accessing the physical NIC receive pointer.

3. The method of claim 1, wherein:
    the virtual NIC includes a Virtio device having a Virtio receive descriptor ring as the virtual NIC receive descriptor ring for the virtual NIC receive pointers, and a Virtio driver to control the Virtio device; and
    the notifying the virtual NIC includes notifying the Virtio driver via an interrupt.

4. The method of claim 1, wherein the host computer includes a transmit buffer for transfer of transmit packets from the virtual NIC to the physical NIC, the virtual NIC includes virtual NIC transmit pointers updated by the virtual NIC to point to transmit packets loaded into the transmit buffer by the virtual NIC, the physical NIC includes physical NIC transmit pointers for retrieval of the transmit packets from the transmit buffer, the method further comprises, at the emulator module, for each transmit packet loaded into the transmit buffer by the virtual NIC:
    accessing a virtual NIC transmit pointer among the virtual NIC transmit pointers that points to the transmit packet loaded into the transmit buffer by the virtual NIC;
    mapping a physical NIC transmit pointer among the physical NIC transmit pointers in the physical NIC to the virtual NIC transmit pointer accessed by the emulator module to enable the physical NIC to retrieve the transmit packet from the transmit buffer using the physical NIC transmit pointer; and
    notifying the physical NIC that the transmit packet is available for retrieval from the transmit buffer.

5. The method of claim 4, further comprising:
    receiving from the virtual NIC a transmit notification that the transmit packet has been loaded; and
    responsive to the notification, performing the accessing the virtual NIC transmit pointer.

6. The method of claim 4, wherein:
    the physical NIC includes a physical NIC transmit descriptor for the physical NIC transmit pointers;

the virtual NIC includes a Virtio device having a Virtio transmit descriptor for the virtual NIC receive pointers, and a Virtio driver to control the Virtio device;

the mapping includes copying the physical NIC transmit pointer accessed by the emulator module from the physical NIC transmit descriptor to the virtual NIC transmit pointer in the Virtio transmit descriptor; and the notifying the virtual NIC includes notifying the Virtio driver via an interrupt.

7. The method of claim 1, wherein the hypervisor includes Linux Kernel-based Virtual Machine (KVM) integrated with a Quick Emulator (QEMU) module as the emulator module.

8. A method comprising:

at an emulator module integrated with a hypervisor configured to execute on a host computer having a physical network interface card (NIC), the hypervisor configured to host a virtual machine having a virtual NIC, the host computer having a transmit buffer for transfer of transmit packets from the virtual NIC to the physical NIC, the virtual NIC including a virtual NIC transmit descriptor ring of virtual NIC transmit pointers updated by the virtual NIC to point to respective transmit packets loaded into respective slots of the transmit buffer by the virtual NIC, the physical NIC including a physical NIC transmit descriptor ring of physical NIC transmit pointers for retrieval of the transmit packets from the transmit buffer, for each transmit packet loaded into the transmit buffer by the virtual NIC:

accessing a virtual NIC transmit pointer among the virtual NIC transmit pointers in the virtual NIC transmit descriptor ring that points to the transmit packet loaded into the respective slot of the transmit buffer by the virtual NIC;

copying the virtual NIC transmit pointer accessed by the emulator module from the virtual NIC transmit descriptor ring to a physical NIC transmit pointer in the physical NIC transmit descriptor ring so that the physical NIC transmit pointer points to the transmit packet in the transmit buffer to enable the physical NIC to retrieve the transmit packet from the respective slot of the transmit buffer using the physical NIC transmit pointer; and notifying the physical NIC that the transmit packet is available for retrieval from the transmit buffer.

9. The method of claim 8, further comprising:

receiving from the virtual NIC a transmit notification that the transmit packet has been loaded; and responsive to the notification, performing the accessing the virtual NIC transmit pointer.

10. The method of claim 8, wherein:

the virtual NIC includes a Virtio device having a Virtio transmit descriptor ring as the virtual NIC transmit descriptor ring for the virtual NIC receive pointers, and a Virtio driver to control the Virtio device; and the notifying the virtual NIC includes notifying the Virtio driver via an interrupt.

11. The method of claim 8, wherein the host computer includes a receive buffer for transfer of receive packets from the physical NIC to the virtual NIC, the physical NIC having physical NIC receive pointers updated by the physical NIC to point to receive packets loaded into the receive buffer by the physical NIC, the virtual NIC including virtual NIC receive pointers for retrieval of the receive packets from the receive buffer, for each receive packet loaded into the receive buffer by the physical NIC:

accessing a physical NIC receive pointer among the physical NIC receive pointers in the physical NIC that points to the receive packet loaded into the receive buffer by the physical NIC;

mapping a virtual NIC receive pointer among the virtual NIC receive pointers to the physical NIC receive pointer accessed by the emulator module to enable the virtual NIC to retrieve the receive packet from the receive buffer using the virtual NIC receive pointer; and notifying the virtual NIC to retrieve the receive packet from the receive buffer.

12. The method of claim 11, further comprising:

prior to the accessing, receiving from the physical NIC a receive notification that the receive packet has been loaded; and responsive to the receive notification, performing the accessing the physical NIC receive pointer.

13. The method of claim 11, wherein:

the virtual NIC includes a Virtio device having a Virtio receive descriptor for the virtual NIC receive pointers, and a Virtio driver to control the Virtio device;

the physical NIC includes a physical NIC receive descriptor for the physical NIC receive pointers;

the mapping includes copying the physical NIC receive pointer accessed by the emulator module from the physical NIC receive descriptor to the virtual NIC receive pointer in the Virtio receive descriptor; and the notifying the virtual NIC includes notifying the Virtio driver via an interrupt.

14. An apparatus comprising:

a physical network interface card (NIC);

a receive buffer coupled to the physical NIC; and a processor coupled with the physical NIC and the receive buffer, and configured to execute an emulator module integrated with a hypervisor, the hypervisor configured to host a virtual machine having a virtual NIC, the receive buffer for transfer of receive packets from the physical NIC to the virtual NIC, the physical NIC including a physical NIC receive descriptor ring of physical NIC receive pointers updated by the physical NIC to point to respective receive packets loaded into respective slots of the receive buffer by the physical NIC, the virtual NIC including a virtual NIC receive descriptor ring of virtual NIC receive pointers for retrieval of the receive packets from the receive buffer, wherein the emulator module is configured to, for each receive packet loaded into the receive buffer by the physical NIC:

access a physical NIC receive pointer among the physical NIC receive pointers in the physical NIC receive descriptor ring of the physical NIC that points to the receive packet loaded into the respective slot of the receive buffer by the physical NIC;

copy the physical NIC receive pointer accessed by the emulator module from the physical NIC receive descriptor ring to a virtual NIC receive pointer in the virtual NIC receive descriptor ring to enable the virtual NIC to retrieve the receive packet from the respective slot of the receive buffer using the virtual NIC receive pointer; and notify the virtual NIC to retrieve the receive packet from the receive buffer.

15. The apparatus of claim 14, wherein the emulator module is further configured to:

prior to the access, receive from the physical NIC a receive notification that the receive packet has been loaded; and responsive to the receive notification, perform the access of the physical NIC receive pointer.

16. The apparatus of claim 14, wherein:
the virtual NIC includes a Virtio device having a Virtio receive descriptor ring as the virtual NIC receive descriptor ring for the virtual NIC receive pointers, and a Virtio driver to control the Virtio device; and
the emulator module is configured to notify the virtual NIC by notifying the Virtio driver via an interrupt.

17. The apparatus of claim 14, wherein the host computer includes a transmit buffer for transfer of transmit packets from the virtual NIC to the physical NIC, the virtual NIC includes virtual NIC transmit pointers updated by the virtual NIC to point to transmit packets loaded into the transmit buffer by the virtual NIC, the physical NIC includes physical NIC transmit pointers for retrieval of the transmit packets from the transmit buffer, wherein the emulator module is configured to, for each transmit packet loaded into the transmit buffer by the virtual NIC:
access a virtual NIC transmit pointer among the virtual NIC transmit pointers that points to the transmit packet loaded into the transmit buffer by the virtual NIC;
map a physical NIC transmit pointer among the physical NIC transmit pointers in the physical NIC to the virtual NIC transmit pointer accessed by the emulator module to enable the physical NIC to retrieve the transmit packet from the transmit buffer using the physical NIC transmit pointer; and
notify the physical NIC that the transmit packet is available for retrieval from the transmit buffer.

18. The apparatus of claim 17, wherein the emulator module is further configured to:
receive from the virtual NIC a transmit notification that the transmit packet has been loaded; and
responsive to the notification, perform the access of the virtual NIC transmit pointer.

19. The apparatus of claim 17, wherein:
the physical NIC includes a physical NIC transmit descriptor for the physical NIC transmit pointers;
the virtual NIC includes a Virtio device having a Virtio transmit descriptor for the virtual NIC transmit pointers, and a Virtio driver to control the Virtio device;
the emulator module is configure to map by copying the physical NIC transmit pointer accessed by the emulator module from the physical NIC transmit descriptor to the virtual NIC transmit pointer in the Virtio transmit descriptor; and
the emulator module is configured to notify the virtual NIC by notifying the Virtio driver via an interrupt.

20. The apparatus of claim 14, wherein the hypervisor includes Linux Kernel-based Virtual Machine (KVM) integrated with a Quick Emulator (QEMU) module as the emulator module.

* * * * *